(12) United States Patent
Martin et al.

(10) Patent No.: US 6,752,738 B1
(45) Date of Patent: Jun. 22, 2004

(54) EIGHT-SPEED AUTOMATIC TRANSMISSION

(75) Inventors: Berthold Martin, Shelby Township, MI (US); John C Collins, Lake Orion, MI (US); Charles K Streetman, Sterling Heights, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/436,568

(22) Filed: May 13, 2003

(51) Int. Cl.$^7$ .................................................. F16H 3/62
(52) U.S. Cl. .................................................... 475/276
(58) Field of Search ........................................ 475/276

(56) References Cited

U.S. PATENT DOCUMENTS

| | | | |
|---|---|---|---|
| 4,719,985 A | * | 1/1988 | Zaiser ........................ 180/245 |
| 5,458,545 A | | 10/1995 | Adam et al. |
| 6,159,124 A | | 12/2000 | Redinger et al. |
| 6,299,565 B1 | | 10/2001 | Jain et al. |
| 6,422,969 B1 | | 7/2002 | Raghavan et al. |

* cited by examiner

*Primary Examiner*—Dirk Wright
(74) *Attorney, Agent, or Firm*—Edwin W. Bacon, Jr.

(57) ABSTRACT

An eight-speed automatic transmission having a compound planetary gear set, a second planetary gear set, and a third planetary gear set each driven by three clutches and fixed to four brakes is provided.

12 Claims, 3 Drawing Sheets

FIG 2

8-SPEED AUTOMATIC TRANSMISSION

| GEAR SELECTION | CLUTCHES APPLIED | SOLENOIDS ENERGIZED |
|---|---|---|
| 1ST | C1 & B1 | CC & MS |
| 2ND | C1 & B2 | B2 & MS |
| 3RD | C1 & B3 | B3 & MS |
| 4TH | C1 & B4 | B4 & MS |
| 5TH | C1 & C2 | C2 & MS |
| 6TH | C2 & B4 | B4 & CI |
| 7TH | C2 & B3 | B3 & CI |
| 8TH | C2 & B2 | B2 & CI |
| REVERSE | C3 & B1 | -- |
| REVERSE (SPEED >8 MPH) | C3 | MS |
| PARK/NEUTRAL | B1 | CC & MS |
| NEUTRAL (SPEED >8 MPH) | -- | MS |
| PARK/NEUTRAL WITH EMCC | B1 | -- |

KEY

C1 - FIRST CLUTCH
C2 - SECOND CLUTCH
C3 - THIRD CLUTCH
B1 - FIRST BRAKE
B2 - SECOND BRAKE
B3 - THIRD BRAKE
B4 - FOURTH BRAKE
MS - MULTISELECT SOLENOID
CC - CONVERTER CLUTCH SOLENOID
MS & CI - NORMALLY OPEN
C2, C3, B2, B3, B4 - NORMALLY CLOSED

EIGHT-SPEED AUTOMATIC TRANSMISSION

FIELD OF THE INVENTION

The present invention relates to automatic transmissions, and more particularly to an eight-speed automatic transmission for use in a motor vehicle.

BACKGROUND OF THE INVENTION

A typical automatic transmission in a motor vehicle has two or three planetary gear sets, one of which receives a torque input from an engine, another one of which is coupled to a drive shaft for providing a torque output. During operation, a set of frictional units couple the torque input from the engine to one or more members of the planetary gear sets. Simultaneously, another set of frictional units holds stationary one or more members of the planetary gear sets. These frictional units provide different ratios of input-to-output torque to the vehicle. It is desirable to provide an automatic transmission for a vehicle that includes a wider range and a larger number of transmission ratios.

Automatic transmissions are typically controlled by a hydraulic control system. These hydraulic control systems are used to engage and disengage the frictional units of the transmission according to the ratio of torque needed. A typical hydraulic control system is disclosed in U.S. Pat. No. 6,159,124 to Redinger et al., herein incorporated by reference. The typical hydraulic control system is composed of various valves that direct and regulate hydraulic pressure to the frictional units via various fluid passages.

SUMMARY OF THE INVENTION

The eight-speed automatic transmission according to the principles of the present invention has a compound planetary gear set, a second planetary gear set, and a third planetary gear set. The compound planetary gear set has a small sun gear, a large sun gear, a first carrier, and a first ring gear. The second planetary gear set has a second sun gear drivingly engaged with the first carrier, a second carrier drivingly engaged with the large sun gear, and a second ring gear. The third planetary gear set has a third sun gear, a third carrier drivingly engaged with the second ring gear and drivingly engaged with an output shaft, and a third ring gear drivingly engaged with the second carrier.

The eight-speed automatic transmission further includes a first clutch selectively receiving an input from an engine and drivingly engaged with the third sun gear, a second clutch selectively receiving an input from the engine and drivingly engaged with the large sun gear and the second carrier, and a third clutch selectively receiving an input from the engine and drivingly engaged with the small sun gear. A first brake is engaged with the third ring gear and the second carrier for selectively fixing the third ring gear and the second carrier from rotation. A second brake is engaged with the first ring gear for selectively fixing the first ring gear from rotation. A third brake is engaged with the first carrier for selectively fixing the first carrier from rotation. A fourth brake is engaged with the small sun gear for selectively fixing the small sun gear from rotation. Selectively engaging one of the clutches and one of the brakes provides an input-to-output torque ratio corresponding to one of eight forward gear speeds and at least one reverse speed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood the detailed description and the accompanying drawings, wherein:

FIG. 2 is a table showing the combination of clutches and brakes to be applied to achieve specific torque ratios according to the principles of the present invention.

DETAILED DESCRIPTION OF THE PREFERRED EMBODIMENTS

The following description of the preferred embodiment is merely exemplary in nature and is in no way intended to limit the invention, its application, or uses.

Figure 1:
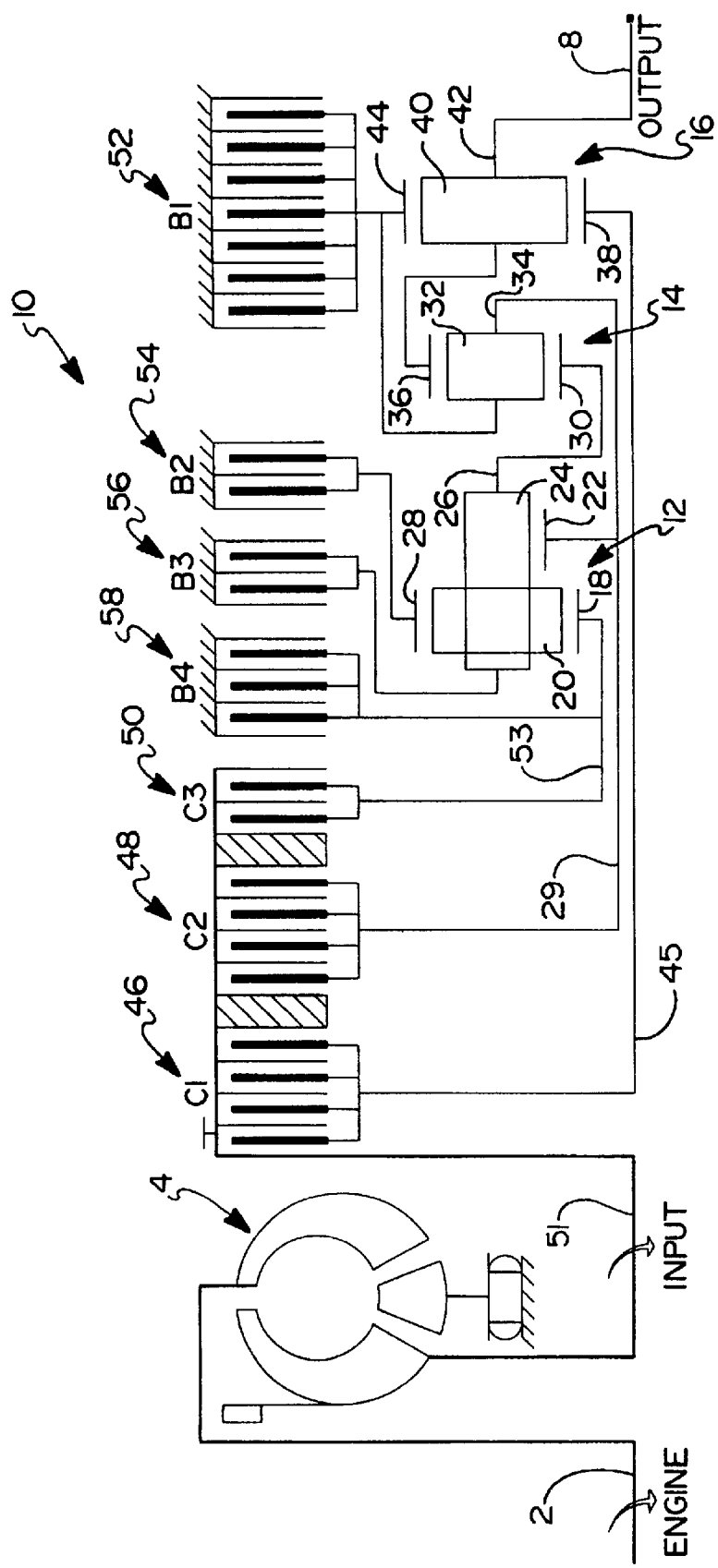
FIG. 1 is a schematic diagram of an eight-speed automatic transmission according to the principles of the present invention.
Figure 3:
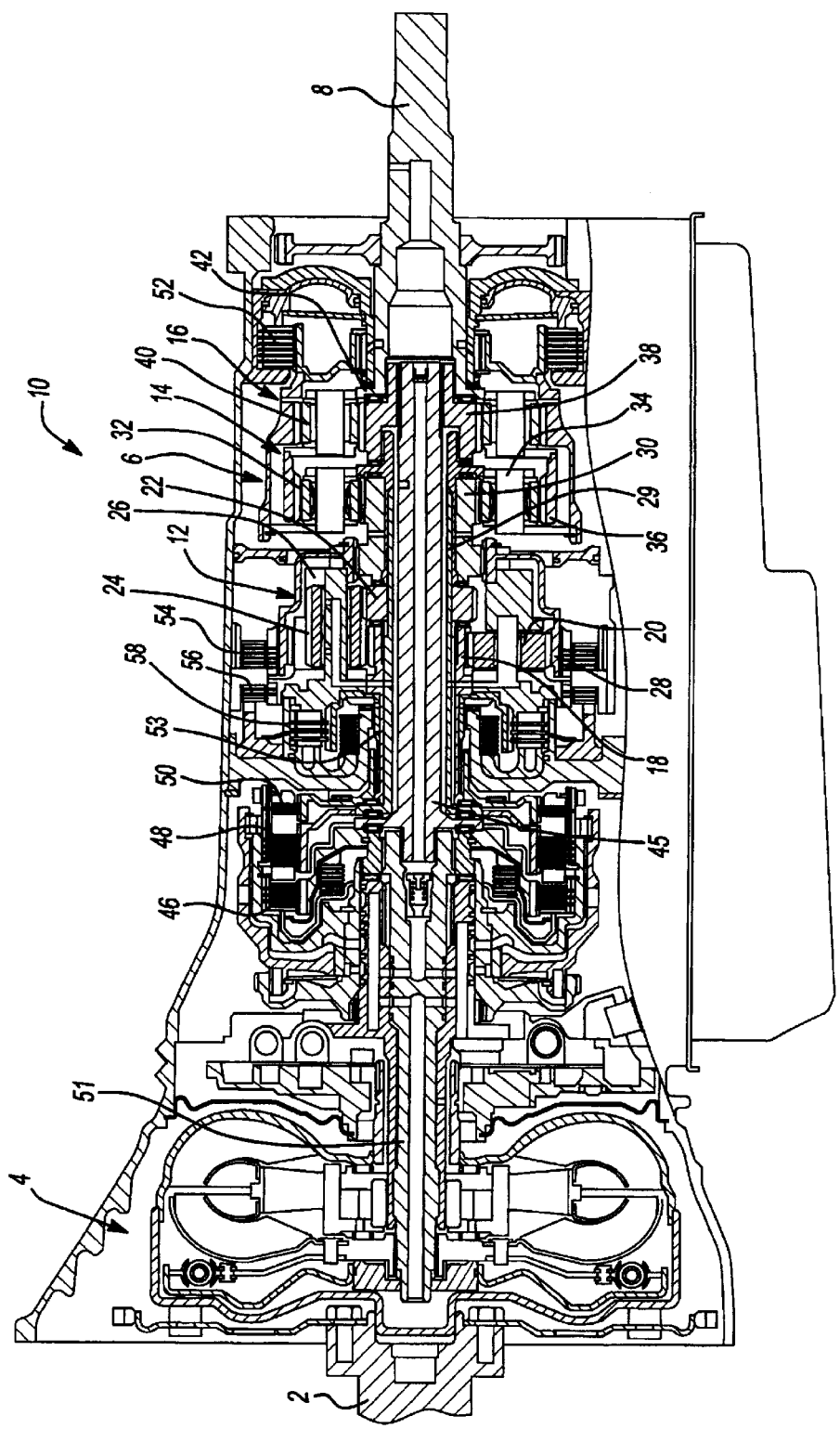
FIG. 3 is a detailed view of the eight-speed automatic transmission according to the principles of the present invention.

Referring to FIGS. 1 and 3, an eight-speed automatic transmission for use in a motor vehicle is generally indicated by reference numeral 10. The eight-speed automatic transmission 10 is linked to an engine, not shown, through an engine output shaft 2. Rotational output from the engine output shaft 2 is received by the eight-speed automatic transmission 10 through a torque converter assembly 4. The torque converter assembly 4 then transfers the rotational output through a gear set 6, as will be described in greater detail below, to a transmission output shaft 8 and then on to the drivetrain of the motor vehicle.

The gear set 6 of the eight-speed automatic transmission 10 comprises a compound planetary gear set 12, a second planetary gear set 14, and a third planetary gear set 16. In the preferred embodiment, the compound planetary gear set 12 is a Ravigneaux Planetary Gear Set as is well known in the art. However, various other gear set types may be employed. The compound planetary gear set 12 includes a small sun gear 18 engaged with a plurality of first pinions 20 (one of which is shown), and a large sun gear 22 engaged with a plurality of second pinions 24 (one of which is shown). The first and second pinions 20, 24 are rotatably supported on a carrier 26 and the plurality of first pinions 20 are engaged with a ring gear 28. The large sun gear is provided with a splined connection to a first intermediate shaft 29.

The second planetary gear set 14 includes a second sun gear 30 engaged with a plurality of pinions 32 (one of which is shown). The plurality of pinions 32 are rotatably supported on a second carrier 34 and engaged with a second ring gear 36. The second sun gear 30 is drivingly engaged with the carrier 26 of the compound gear set 12. The second carrier 34 is drivingly connected to the first intermediate shaft 29.

The third planetary gear set 16 includes a third sun gear 38 engaged with a plurality of pinions 40. The plurality of pinions 40 are rotatably supported on a third carrier 42 and engaged with a third ring gear 44. The third carrier 42 is drivingly engaged with the second ring gear 36 of the second planetary gear set 14. The third ring gear 44 is drivingly engaged with the second carrier 34 of the second planetary gear set 14. The third carrier 42 rotates to produce a torque output to the transmission output shaft 8. The third sun gear 38 is provided with a splined connection to a second intermediate shaft 45 concentrically disposed with said first intermediate shaft 29.

The eight-speed automatic transmission 10 further includes a first clutch 46, a second clutch 48, and a third clutch 50. Clutches 46, 48, and 50 are each selectively engagable to receive the torque input from the torque converter assembly 4 via a transmission input shaft 51. The first clutch 46 is drivingly connected to the third sun gear 38 of the third planetary gear set 16 via shaft 45. The second clutch 48 is drivingly connected to the large sun gear 22 of the compound planetary gear set 12 as well as to the second carrier 34 of the second planetary gear set 14 via shaft 29. The third clutch 50 is drivingly connected to the small sun gear 18 of the compound planetary gear set 12 via a third intermediate shaft 53.

The eight-speed automatic transmission 10 further includes a first brake 52, a second brake 54, a third brake 56, and a fourth brake 58. The first brake 52 is drivingly connected to the third ring gear 44 of the third planetary gear set 16, the second carrier 34 of the second planetary gear set 14, as well as the first intermediate shaft 29. The second brake 54 is drivingly connected to the ring gear 28 of the compound planetary gear set 12. The third brake 56 is drivingly connected to the carrier 26 of the compound planetary gear set 12, as well as the second sun gear 30 of the second planetary gear set 14. The fourth brake 58 is drivingly connected to the small sun gear 18 of the compound planetary gear set 12 via the third intermediate shaft 53. Each of the brakes 52, 54, 56, 58 is selectively fixable such that the brakes 52, 54, 56, 58 prevent rotation of corresponding attached planetary gear set components.

During operation of the eight-speed automatic transmission 10, the torque input from the input shaft 51 is transferred through one of the clutches 46, 48, 50 to the planetary gear sets 12, 14, 16 and on to the third carrier 42 providing the torque output to output shaft 8. The third carrier 42 is connected to the transmission output shaft 8 which transmits the rotational output of the engine to the drivetrain of the motor vehicle. To achieve specific torque input-to-output ratios, one or more of the clutches 46, 48, 50 and brakes 52, 54, 56, 58 are engaged to receive torque input from the engine and/or to prevent rotation of attached gears and/or carriers. There is shown in FIG. 2 a table illustrating the combination of clutches and brakes engagable to achieve specific torque input-to-output ratios. Each clutch and brake combination corresponds to one of eight forward gear speeds, two reverse speeds, and two neutral speeds, each of which correspond to a torque input-to-output ratio.

The above description of the invention is merely exemplary in nature and, thus, variations that do not depart from the general scheme of the invention are intended to be within the scope of the invention. Such variations are not to be regarded as a departure from the spirit and scope of the invention.

What is claimed is:

1. An eight-speed automatic transmission comprising:
a compound planetary gear set having a pair of sun gears, a first carrier, and a first ring gear;
a second planetary gear set having a second sun gear, a second carrier, and a second ring gear, said second sun gear drivingly engaged with said first carrier, said second carrier drivingly engaged with one of said pair of sun gears;
a third planetary gear set having a third sun gear, a third carrier, and a third ring gear, said third carrier drivingly engaged with said second ring gear and drivingly engaged with an output shaft, said third ring gear drivingly engaged with said second carrier;
a first clutch selectively receiving a torque input from an engine, said first clutch drivingly engagable with said third sun gear;
a second clutch selectively receiving a torque input from said engine, said second clutch drivingly engagable with said one of said pair of sun gears and said second carrier;
a third clutch selectively receiving a torque input from said engine, said third clutch drivingly engagable with the other of said pair of sun gears;
a first brake engagable with said third ring gear and said second carrier for selectively fixing said third ring gear and said second carrier from rotation;
a second brake engagable with said first ring gear for selectively fixing said first ring gear from rotation;
a third brake engagable with said first carrier for selectively fixing said first carrier from rotation; and
a fourth brake engagable with said other of said pair of sun gears for selectively fixing said other of said pair of sun gears from rotation;
wherein selectively engaging one or more of said first clutch, said second clutch, said third clutch, said first brake, said second brake, said third brake, and said fourth brake provides a torque input-to-output ratio corresponding to one of eight forward gear ratios and at least one reverse ratio, and said first, second, and third clutches and said first, second, third, and fourth brakes are selectively engaged by flow regulating valves.

2. The eight-speed automatic transmission of claim 1, wherein a first gear ratio is achieved by actuating said first clutch while simultaneously fixing said first brake.

3. The eight-speed automatic transmission of claim 2, wherein a second gear ratio is achieved by actuating said first clutch while simultaneously fixing said second brake.

4. The eight-speed automatic transmission of claim 3, wherein a third gear ratio is achieved by actuating said first clutch while simultaneously fixing said third brake.

5. The eight-speed automatic transmission of claim 4, wherein a fourth gear ratio is achieved by actuating said first clutch while simultaneously fixing said fourth brake.

6. The eight-speed automatic transmission of claim 5, wherein a fifth gear ratio is achieved by actuating said first clutch while simultaneously actuating said second clutch.

7. The eight-speed automatic transmission of claim 6, wherein a sixth gear ratio is achieved by actuating said second clutch while simultaneously fixing said fourth brake.

8. The eight-speed automatic transmission of claim 7, wherein a seventh gear ratio is achieved by actuating said second clutch while simultaneously fixing said third brake.

9. The eight-speed automatic transmission of claim 8, wherein an eighth gear ratio is achieved by actuating said second clutch while simultaneously fixing said second brake.

10. The eight-speed automatic transmission of claim 9, wherein a reverse gear ratio is achieved by actuating said third clutch while simultaneously fixing said first brake.

11. The eight-speed automatic transmission of claim 10, wherein a second reverse gear ratio is achieved by actuating said third clutch while simultaneously fixing said second brake.

12. The eight-speed automatic transmission of claim 2, wherein a neutral gear ratio is achieved by fixing said first brake.

* * * * *